E. J. SCOTT.
FRICTION COIL CLUTCH.
APPLICATION FILED NOV. 15, 1913.
1,159,717.
Patented Nov. 9, 1915.
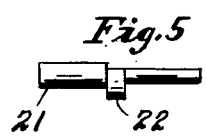
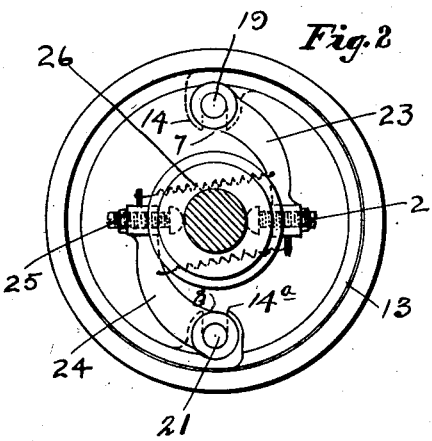
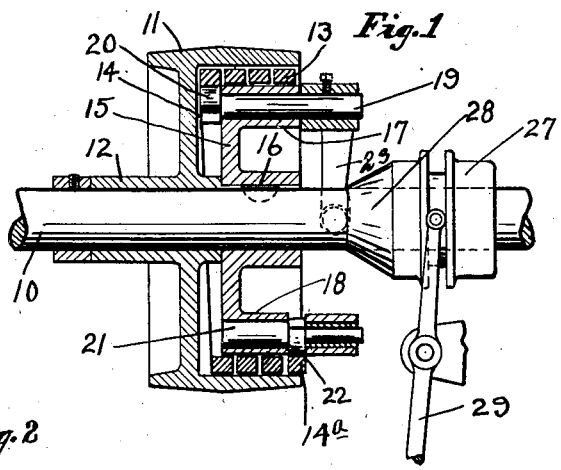
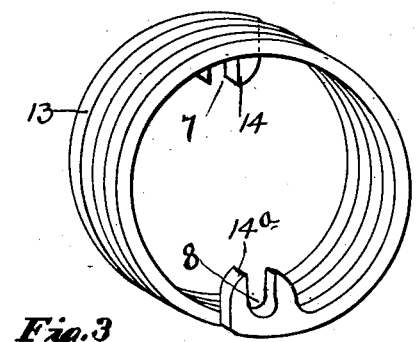
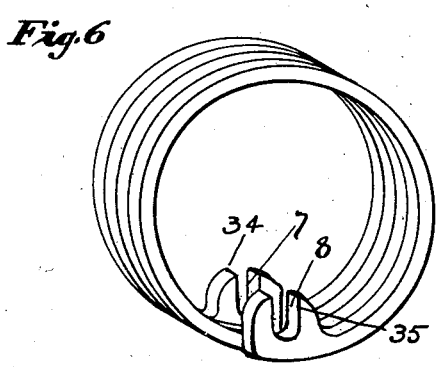
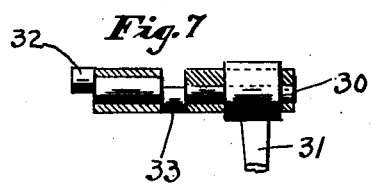
Witnesses
E. I. Ogden
J. L. Macdermott
Inventor
Ephriam J. Scott
By
Howard E. Barlow
Attorney

UNITED STATES PATENT OFFICE.

EPHRIAM J. SCOTT, OF PROVIDENCE, RHODE ISLAND.

FRICTION-COIL CLUTCH.

1,159,717.   Specification of Letters Patent.   Patented Nov. 9, 1915.

Application filed November 15, 1913. Serial No. 801,297.

*To all whom it may concern:*

Be it known that I, EPHRIAM J. SCOTT, a citizen of the United States, and resident of the city of Providence, in the county of Providence and State of Rhode Island, have invented certain new and useful Improvements in Friction-Coil Clutches, of which the following is a specification.

This invention relates to friction coil clutches and has for its object to provide a helically formed friction coil adapted to be expanded to engage the interior surface of an inclosing power transmitting member.

A further object of the invention is the provision of a cam for controlling the engaging and disengaging action of the coil with its inclosing member and a lever through which the cam is actuated. And a still further object of the invention is to provide suitable adjustable means whereby the degree of expansion of the coil may be nicely regulated.

With these and other objects in view, the invention consists of certain novel features of construction, as will be more fully described and particularly pointed out in the appended claims.

Of the accompanying drawings: Figure 1— is a central sectional side elevation of my improved clutch. Fig. 2— is an end view of the clutch looking from the right. Fig. 3— is a detail of the coil showing the ends as located on diametrically opposite sides of the coil. Fig. 4— is a detail of one of the cam shafts. Fig. 5— is a detail of the other cam shaft. Fig. 6— is a detail showing a modification in which the opposite ends of the coil are both on the same side thereof and in line with each other. Fig. 7— is a detail of the single cam shaft having cams thereon adapted to engage and actuate both ends of the modified form of coil simultaneously by a single operation.

Referring to the drawings, 10 designates the shaft carrying the clutch mechanism, and may be either driven through the pulley or power transmitting member 11, or it may serve as a driver for the pulley, which is shown in the drawings as being provided with a hub 12 running loosely on the shaft.

A helical coil 13, having an external friction surface, is located within the pulley, its opposite ends being provided with lugs 14 and 14ª respectively, each having a cam receiving recess, said ends being preferably located on diametrically opposite sides of the coil, as shown in Fig. 3. A plate 15 is keyed at 16 to the shaft 10 and is provided with bosses 17 and 18 arranged on diametrically opposite sides thereof and near its outer edge. The boss 17 is arranged to carry the cam shaft 19, one end of which is provided with a cam 20 engaging the aperture 7 in the lug 14, and the boss 18 is arranged to carry the cam shaft 21 having a cam 22 engaging the aperture 8 in the opposite lug 14ª of the coil. To the outer end of these cam shafts 19 and 21 are fixed arms 23 and 24 respectively and in the free ends of each is mounted an adjustable screw 25 whose heads bear against the shaft 10 when the coil is in contracted position. These arms are under the tension of the light springs 26 to draw them inward and hold the friction coil normally in contracted or disengaged position, said springs also serving to counterbalance or offset the centrifugal force upon the arms when the device is being rapidly rotated. In order to control the action of these cams and to cause them to rotate in their respective bearings for the purpose of expanding the spring against the friction surface of the pulley, I have provided a collar or hub 27 which is slidably mounted on the shaft 10, one end of which has a conically shaped engaging portion 28 to serve as a wedge for raising and lowering the free ends of said arms, and by which the action of the clutch may be nicely controlled. This collar may be operated manually or otherwise by the yoke 29. It will be noted that by the use of these levers the force of the cam action is greatly increased and the wedging action of the collar is rendered very effective and its operation easy. Another advantage of this construction is that the gripping effect of the coil may be nicely regulated by a simple adjustment of the screws 25 on the ends of the lever arms.

The modification shown in Figs. 6 and 7 simply illustrate another method by which the cams may be applied to the spring coil, that is, instead of mounting the cams on opposite sides of the shaft 10 and on separate shafts to be operated by separate lever arms, as above described, the cams 32 and 33 may both be connected to and operated by a single shaft 30 and by a single lever arm 31 in which case the ends 34 and 35 of the spring coil will be brought down into line with each other, as illustrated in Fig. 6, and the single cam shaft arranged to operate both simultaneously.

I claim:

1. A clutch comprising a power transmitting member having an internal friction surface, an expandible friction coil within said member, a rotatable cam operatively mounted to control the engaging and disengaging action of said coil, and means for rotating said cam.

2. A clutch comprising a power transmitting member having an internal friction surface, an expandible friction coil within said member, a rotatable cam operatively mounted to control the engaging and disengaging action of said coil, and a lever for increasing the force of the cam action.

3. A clutch comprising a friction coil, an inclosing power transmitting member for said coil, a cam for controlling the engaging and disengaging action between said coil and member, and a lever for increasing the force of the cam action, and means in said lever for regulating the degree of expansion of each coil.

4. In a clutch, a shaft, a resilient expandible friction coil, a power transmitting member inclosing said coil, a rotatable cam for controlling the engaging and disengaging action of said coil with said member, a lever for increasing the force of said cam action, and an actuating member operatively mounted on said shaft by which said cam is operated through the movement of said lever.

5. In a clutch, a shaft, a resilient expandible friction coil, a power transmitting member inclosing said coil, a cam for controlling the engaging and disengaging action of said coil with said member, a lever for increasing the force of said cam action, an actuating member operatively mounted on said shaft by which said cam is operated through the movement of said lever, and adjustable means in said lever for regulating the degree of expansion of said coil.

6. In a clutch, a shaft, a resilient expandible friction coil, a power transmitting drum in which said coil is mounted, a pair of cams for engaging the opposite ends of said coil and expanding the same against the inner surface of said drum, a lever through which said cams are actuated and a slidable member on said shaft for operating said lever.

In testimony whereof I affix my signature in presence of two witnesses.

EPHRIAM J. SCOTT.

Witnesses:
 HOWARD E. BARLOW,
 E. I. OGDEN.